(12) United States Patent
Park et al.

(10) Patent No.: US 8,351,453 B2
(45) Date of Patent: Jan. 8, 2013

(54) METHODS AND APPARATUS TO ALLOCATE SHARED RESOURCES OF A HIGH SPEED PACKET ACCESS CHANNEL IN A COMMUNICATION NETWORK

(75) Inventors: Sun-Uk Park, Union City, CA (US); Jian Li, Sunnyvale, CA (US); Zhi Li, Martinez, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 694 days.

(21) Appl. No.: 11/962,441

(22) Filed: Dec. 21, 2007

(65) Prior Publication Data

US 2009/0161688 A1 Jun. 25, 2009

(51) Int. Cl.
H04L 12/28 (2006.01)

(52) U.S. Cl. ........ 370/431; 370/310; 370/329; 455/450; 709/226

(58) Field of Classification Search .... 370/395.4–395.5, 370/431–463; 709/223, 226; 455/403, 422.1, 455/450–455
See application file for complete search history.

(56) References Cited

U.S. PATENT DOCUMENTS

| | | | |
|---|---|---|---|
| 6,182,052 B1 * | 1/2001 | Fulton et al. | 705/26 |
| 6,480,861 B1 * | 11/2002 | Kanevsky et al. | 707/103 Y |
| 2001/0025310 A1 * | 9/2001 | Krishnamurthy et al. | 709/223 |
| 2002/0133589 A1 * | 9/2002 | Gubbi et al. | 709/225 |
| 2002/0197999 A1 * | 12/2002 | Wu et al. | 455/452 |
| 2004/0066754 A1 | 4/2004 | Hottinen | |
| 2004/0213185 A1 | 10/2004 | Oh et al. | |
| 2005/0164153 A1 * | 7/2005 | Beatty et al. | 434/350 |
| 2005/0176440 A1 | 8/2005 | Sang et al. | |
| 2006/0050637 A1 | 3/2006 | Wigard et al. | |
| 2006/0072691 A1 | 4/2006 | Kent et al. | |
| 2006/0079221 A1 | 4/2006 | Grant et al. | |
| 2006/0126577 A1 | 6/2006 | Yano et al. | |
| 2006/0142040 A1 | 6/2006 | Jones | |
| 2006/0194585 A1 | 8/2006 | Usuda et al. | |
| 2006/0203773 A1 | 9/2006 | Georges et al. | |

(Continued)

OTHER PUBLICATIONS

Wikipedia. High-Speed Downlink Packet Access. Nov. 10, 2006. http://web.archive.org/web/20061110213839/http://en.wikipedia.org/wiki/High-Speed_Downlink_Packet_Access.*
Antti Toskala, Harri Holma, Troels Kolding, Frank Frederiksen, and Preben Mogensen, "High-speed Downlink Packet Access", 2002 John Wiley & Sons, Ltd., 26 pages.
Jose Luis Pradas Adan, "Effect of multiple simultaneous HSDPA users on HSDPA end-user performance for non-real time services in one cell system.", Aug. 7, 2006, 88 pages.

*Primary Examiner* — Hassan Kizou
*Assistant Examiner* — Ashil Farahmand
(74) *Attorney, Agent, or Firm* — Hanley, Flight, & Zimmerman, LLC

(57) ABSTRACT

Methods and apparatus to allocate shared resources of a high speed packet access channel in a communication network are disclosed. An example method to allocate shared resources of a high speed packet access channel disclosed herein comprises providing information to a user device describing a plurality of service options for exchanging data over the high speed packet access channel, wherein the information comprises a plurality of costs based on an availability of the shared resources, and allocating at least a portion of the shared resources of the high speed packet access channel to the user device according to a selected service option from the plurality of service options.

19 Claims, 6 Drawing Sheets

U.S. PATENT DOCUMENTS

| | | |
|---|---|---|
| 2006/0209692 A1 | 9/2006 | Usuda et al. |
| 2006/0221892 A1 | 10/2006 | Usuda et al. |
| 2006/0221923 A1 | 10/2006 | Usuda et al. |
| 2007/0025264 A1 | 2/2007 | Cheng et al. |
| 2007/0091801 A1 | 4/2007 | Shahidl et al. |
| 2007/0091855 A1 | 4/2007 | Karaoguz et al. |
| 2007/0091863 A1 | 4/2007 | Sampath et al. |
| 2007/0127522 A1 | 6/2007 | Lundh et al. |
| 2007/0183350 A1 | 8/2007 | Walker et al. |
| 2007/0207814 A1 | 9/2007 | Usuda et al. |
| 2008/0274715 A1* | 11/2008 | Heit et al. .................... 455/406 |

* cited by examiner

METHODS AND APPARATUS TO ALLOCATE SHARED RESOURCES OF A HIGH SPEED PACKET ACCESS CHANNEL IN A COMMUNICATION NETWORK

FIELD OF THE DISCLOSURE

This disclosure relates generally to communication networks and, more particularly, to methods and apparatus to allocate shared resources of a high speed packet access channel in a communication network.

BACKGROUND

To support consumer demand for multimedia rich applications and services, wireless network vendors and providers have adopted High Speed Packet Access (HSPA) technologies to increase downlink (and, in some cases, uplink) data rates in the latest mobile networks. For example, the High Speed Downlink Packet Access (HSDPA) channel has been adopted by the Third Generation Partnership Project (3GPP) for use in implementing Universal Mobile Telecommunications System (UMTS) mobile networks based on Wideband Code Division Multiple Access (WCDMA) technology. The HSDPA channel is a shared common "fat pipe" channel capable of supporting a peak data rate of up to 14.4 Mbps.

In a given cell, the HSDPA channel is divided into a plurality of timeslots and is implemented using some of the available transmission power and WCDMA channel codes. The channel codes and time slots comprising the HSDPA channel are treated as shared resources to be dynamically allocated to user devices in both the code and time domains, respectively. In a typical UMTS WCDMA mobile network, the shared resources of the HSDPA channel are allocated in a best-effort manner without any application awareness and/or service guarantees. Additionally, simultaneous requests from multiple user devices for allocation of the HSDPA channel's shared resources are typically handled on a first-come-first-served basis regardless of the applications and/or services to be provided to any particular requesting user device.

DETAILED DESCRIPTION

Figure 1:
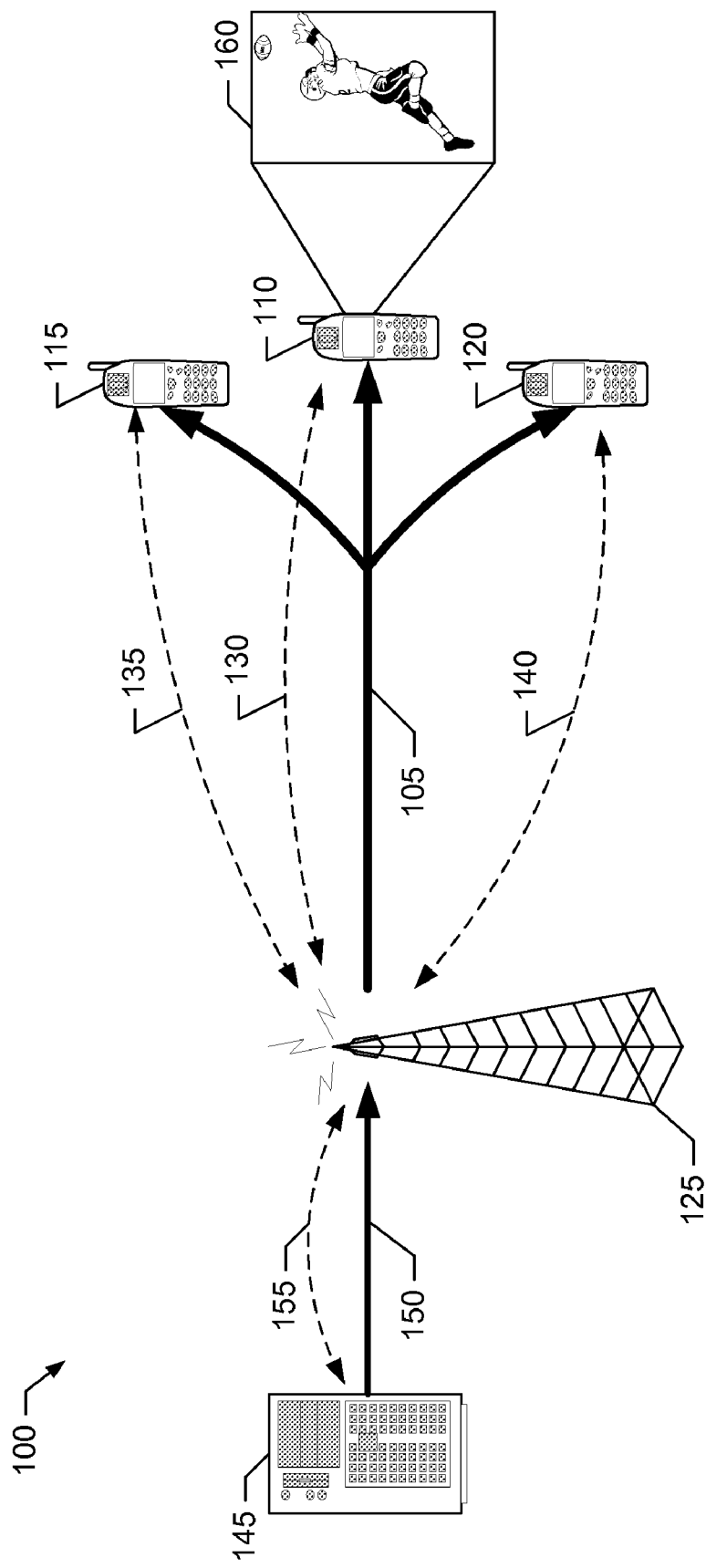
FIG. 1 is a block diagram of a first example mobile communication network capable of allocating the shared resources of a High Speed Packet Access (HSPA) channel according to the methods and apparatus disclosed herein.

A block diagram of a first example mobile communication network 100 capable of allocating the shared resources of a High Speed Packet Access (HSPA) channel according to the methods and apparatus disclosed herein is shown in FIG. 1. In particular, the example mobile communication network 100 implements a Wideband Code Division Multiple Access (WCDMA) communication network according to the Universal Mobile Telecommunications System (UMTS) standard. The communication network 100 of the illustrated example further implements a High Speed Downlink Packet Access (HSDPA) channel 105 (a type of High Speed Packet Access (HSPA) channel) to provide a shared, high data rate channel to user devices 110-120 operating in the network 100. Although the illustrated example depicts the communication network 100 as a WCDMA communication network implementing the HSDPA channel 105, the example methods and apparatus disclosed herein are not limited to application only in WCDMA networks. For example, the methods and apparatus disclosed herein may be readily adapted for use in any communication network implementing a shared channel, link, etc., for transmitting data to user devices.

In the illustrated example of FIG. 1, dashed directional lines indicate communication paths carrying control (erg., signaling) traffic and solid directional lines indicate communication paths carrying user data traffic. To implement a WCDMA network, the example communication network 100 includes an example base station 125 configured to support the signaling and data channels, and associated signaling and user traffic protocols, of a WCDMA communication network compliant with the UMTS standard. For example, as illustrated in FIG. 1, the base station 125 has established such signaling channels 130, 135, 140 associated, respectively, with the example user devices 110, 115, 120 operating in the example communication network 100. Additionally, the example base station 125 supports the HSDPA channel 105 for transmitting data traffic to the example user devices 110-120.

Any or all of the user devices 110-120 included in the example communication network 100 may be implemented by any User Endpoints (UE) or Customer Premises Equipment (CPE), such as, for example, a mobile or fixed cellular telephone, a personal digital assistant (PDA), a personal multimedia device, a personal computer/notebook, etc. The example signaling channels 135-140 may correspond to, for example, one or more Dedicated Channels (DCHs) carried by corresponding one or more downlink and uplink Dedicated Physical Channels (DPCHs) as defined in the UMTS standard. The example HSDPA channel 105 may correspond to, for example, a High Speed Downlink Shared Channel (HS-DSCH) carried by a High Speed Physical Downlink Shared Channel (HS-PDSCH) as defined in the UMTS standard.

The example communication network 100 also includes one or more application servers 145. For ease of discussion, only one application server 145 is illustrated in FIG. 1, although any number of application servers may be included in the example communication network 100. The example application server 145 may be implemented by one or more servers programmed with machine readable instructions, and each such server may include one or more processors for executing instructions stored in a machine readable memory. The example application server 145 is configured to provide application content to one or more of the user devices 110-120 operating in the example communication network 100. The application content provided by the example application server 145 includes, for example, television and/or video-on-demand programming, streaming video content, games, webpages, music and/or other data files, etc.

In some example implementations, the application server 145 may be maintained by the same service provider responsible for the example base station 125 and, thus, may reside in the service provider's proprietary network. In other example implementations, the application server 145 may be maintained by a third-party provider and may reside external to the service provider's proprietary network. In either case, the example application server 145 is coupled to the example base station 125 using any appropriate traffic connection 150 and signaling connection 155. For example, the traffic connection 150 and the signaling connection 155 may be implemented via an Internet connection carrying Transmission Control Protocol (TCP) and Internet Protocol (IP) (i.e., TCP/IP) signaling and data traffic, and/or a satellite link, a microwave link, etc.

The example communication network 100 implements the example HSDPA channel 105 to provide increased downlink (i.e., network-to-user) bandwidth to the example user devices 110-120 to support the higher data rates required by multimedia applications, such as transmission of the application content provided by the application server 145. The example HSDPA channel 105 is divided into a plurality of timeslots and may be implemented in the example communication network 100 using some of the available transmission power and some of the WCDMA channel codes provided by the example base station 125. The channel codes and time slots comprising the HSDPA channel 105 are treated as shared resources to be dynamically allocated to the user devices 110-120 in both the code and time domains, respectively. As such, the multiple user devices 110-120 may compete for allocation of a portion of the shared resources of the HSDPA channel 105.

In conventional WCDMA networks, instead of allocating bandwidth based on the actual bandwidth (data rate) requirements of the particular application content, the bandwidth of an HSDPA channel might be allocated to one or more of the user devices in a best-effort manner without application awareness or service guarantee. For example, some wireless service vendors/providers configure their wireless base stations to initially allocate a fixed bandwidth of the HSDPA channel to all packet data users regardless of any particular application and then upgrade or downgrade the allocated bandwidth, if possible, according to the subsequent resource needs of each user device. Additionally, existing HSDPA bandwidth allocation techniques typically employ a first-come, first-serve priority scheme for allocating bandwidth to users. These existing best-effort and first-come, first-serve bandwidth allocation techniques may yield sub-optimal use of the HSDPA channel, negatively impacting the HSDPA channel's revenue generation potential.

However, in the illustrated example, the base station 125 operates according to the methods and apparatus described herein to allocate portions of the shared resources of the HSDPA channel 105 to each of the user devices 110-120 in an application-aware manner and with an awareness of some or all of the requests for shared resource allocation received during a given interval of time. For example, in an example operation of the communication network 100 according to the methods and apparatus described herein, the example user device 110 queries the application server 145 to obtain application content, such as, for example, streaming video content (or any other available application content). The user device 110 of the illustrated example sends the query to the application server via the signaling channel 130 and the signaling connection 155.

Assuming for ease of discussion and without loss of generality that the user device 110 is requesting streaming video content, the example application server 145 responds to the query by providing a list of service options for offering the requested streaming video content. For example, the application server 145 may provide a list of offered video resolutions and/or corresponding required bit rates for providing the requested streaming video content. In the illustrated example, the application server 145 provides the list of service options for offering the requested application content to the user device 110 via the signaling connection 155 and the signaling channel 130.

Next, the example user device 110 negotiates with the example base station 125 for allocation of some or all of the shared resources of the HSDPA channel 105. The negotiation between the user device 110 and the base station 125 is based on, for example, the availability of the shared resources of the HSDPA channel 105 and a set of costs associated with different service options that may be supported using different portions of the shared HSDPA resources. For example, the base station 125 may obtain the list of service options for offering the streaming video content requested by the user device 110 from, for example, the user device 110 via the signaling channel 130 and/or by extracting the information from the message(s) exchanged between the application server 145 and the user device 110 via the signaling connection 155. Using this list of service options, the base station 125 of the illustrated example determines the costs for allocating the appropriate portions of the shared resources (e.g., channel codes and/or time slots) of the HSDPA channel 105 to support the different service options (e.g., video resolutions/required bit rates) for providing the requested streaming video content. For example, and as discussed in greater detail below, the example base station 125 can implement one or more algorithms to determine the set of costs to improve revenue generation while guaranteeing service delivery quality on the HSDPA channel 105. Additionally, the cost determination algorithms implemented by the example base station 125 can be implemented to factor in service requests from other user devices, such as, for example, the user devices 115 and/or 120, to optimize the resource allocation of the HSDPA channel 105.

After receiving a list of the different shared resource allocation costs from the example base station 125 via, for example, the signaling channel 130, the example user device 110 selects one of the available service options and/or consents to a particular cost for providing the requested application content. For example, the user device 110 may consent (e.g., based on user input, prior configuration information, the user's service plan, etc.) to a higher service fee to obtain a higher HSDPA shared resource allocation for streaming the requested video content at a better service quality. In response to receiving the selection/consent via, for example, the signaling channel 130, the example base station 125 allocates and guarantees the negotiated shared resources (e.g., codes and/or time slots) for the user device 110. For example, in the context of the HSDPA channel 105, the base station 125 may reserve the required amount of time slots and/or channel codes to allocate the negotiated portion of the shared resources to provide the requested streaming video content at the desired quality of service.

After selecting the desired service option and being allocated the appropriate portion of the shared resources of the HSDPA channel 105, the example user device 110 requests the application content from the application server 145 with an appropriate data rate corresponding to the bandwidth allocated by the base station 125. For example, in the context of streaming video content, the user device 110 requests the desired video content, and the application server 145 begins providing (e.g., streaming) the video content at the desired video resolution/bit rate via, for example, the traffic connection 150. The example base station 125, in turn, transmits the application content (e.g., streaming video) to the user device 110 at the negotiated and guaranteed bit rate over the HSPDA channel 105. Additionally, in the illustrated example, after the user device 110 receives and begins processing the application content (e.g., shown as the application content 160 in FIG. 1), the user device 110 may renegotiate its allocation of shared resources of the HSDPA channel 105, as discussed in greater detail below. In this way, the user device 110 may be allocated only the amount of bandwidth that is needed/desired for receiving particular application content 160 at a desired quality of service.

Figure 2:
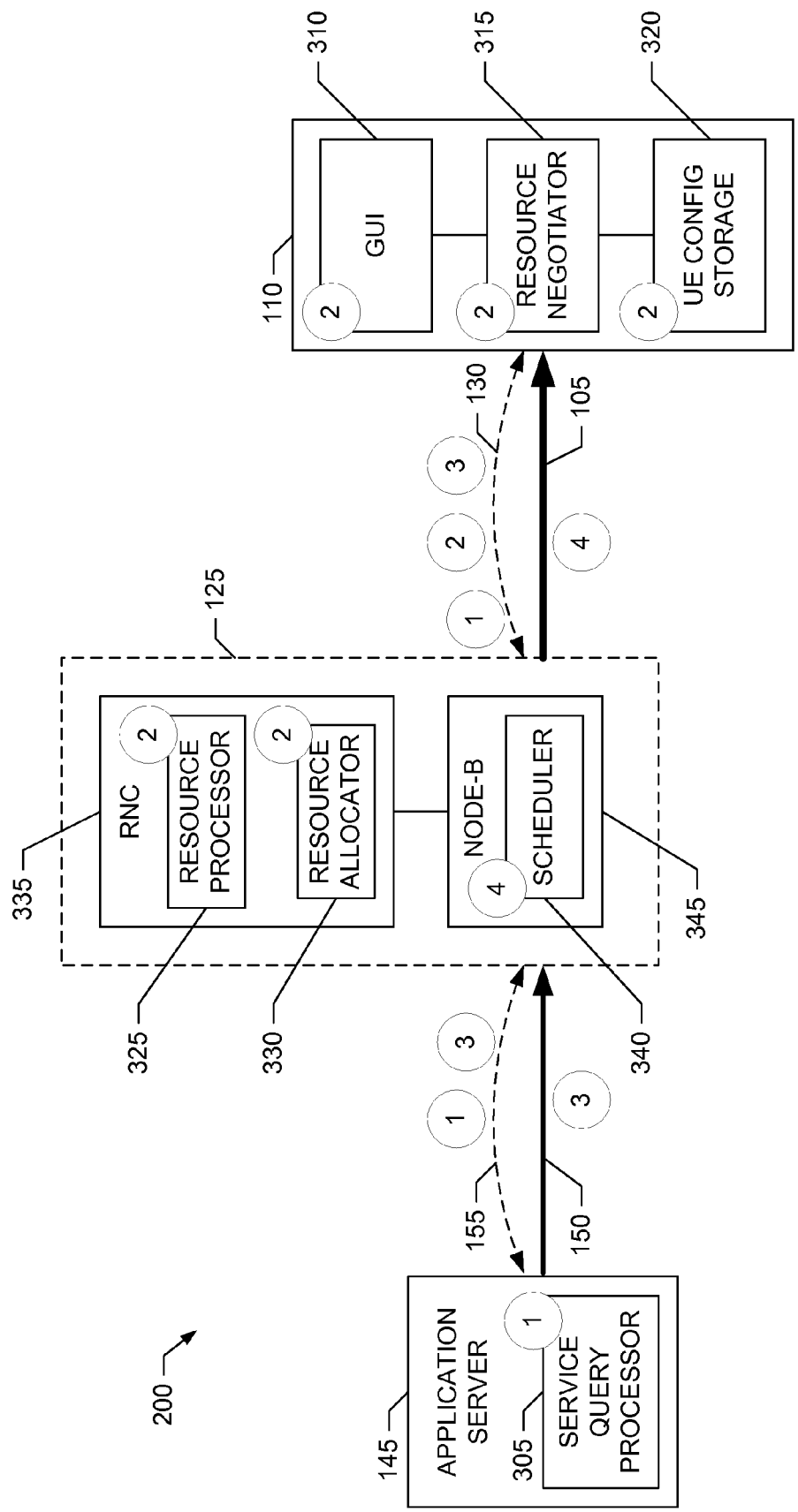
FIG. 2 is a block diagram of a second example mobile communication network capable of allocating the shared resources of an HSPA channel according to the methods and apparatus disclosed herein.

A block diagram of a second example mobile communication network 200 capable of allocating the shared resources of an HSPA channel according to the methods and apparatus disclosed herein is shown in FIG. 2. The second example mobile communication network 200 of FIG. 2 illustrates a more detailed view of a portion of the first example mobile communication network 100 of FIG. 1 and, therefore, includes many elements in common with the first example mobile communication network 100. As such, like elements in FIGS. 1 and 2 are labeled with the same reference numerals. For brevity, the detailed descriptions of these like elements are provided above in connection with the discussion of FIG. 1 and, therefore, are not repeated in the discussion of FIG. 2.

Turning to FIG. 2, the second example mobile communication network 200 also implements a WCDMA communication network according to the UMTS standard and includes the example HSDPA channel 105, the example user device 110, the example base station 125, the example signaling channel 130, the example application server 145, the example traffic connection 150 and the example signaling connection 155 described above in connection with the example communication network 100 of FIG. 1. Compared to FIG. 1, FIG. 2 also provides more detailed block diagrams of the example user device 110, the example base station 125 and the example application server 145 to illustrate the HSDPA shared resource allocation functionality implemented by the second example mobile communication network 200. Additionally, the resource allocation functionality implemented by the second example mobile communication network 200 is divided into four phases, with each phase denoted by an appropriately numbered circle in FIG. 2.

To implement HSDPA shared resource allocation according to the methods and apparatus described herein, the example application server 145 of FIG. 2 includes a query service processor 305 to receive queries from the example user device 110 requesting application content, such as, for example, the streaming video content discussed above. In response to such an application content query, the example query service processor 305 provides a list of service options (e.g., such as video resolutions and/or corresponding bit rates) for providing the requested application content. The example query service processor 305 receives and responds to the application content queries via the example signaling channel 130 and the signaling connection 155 during a first phase of HSDPA shared resource allocation as indicated by the circles labeled with a number "1" in FIG. 2.

To perform the second phase of HSDPA shared resource allocation as indicated by the circles labeled with a number "2" in FIG. 2, the example user device 110 includes a graphical user interface (GUI) 310 (e.g., implemented by any appropriate module, processor, etc.), a resource negotiator 315 and a user equipment (UE) configuration storage element 320 to process the list of service options (e.g., such as video resolutions and/or corresponding bit rates) received from the example application server 145. The example UE configuration storage element 320 may be implemented by any appropriate memory element, device, etc. In an example implementation, the resource negotiator 315 is configured to obtain, via the example signaling channel 130 and the signaling connection 155, the list of service options from the application server 145 for providing the requested application content. Additionally, the example resource negotiator provides the list of service options to the example base station 125 via the example signaling channel 130 to obtain a list of costs associated, respectively, with the list of service options. Alternatively, the example base station 125 may extract the list of service options from the message(s) exchanged between the application server 145 and the user device 110 via the signaling connection 155. In either implementation, the example base station 125 determines the costs associated with allocating the appropriate portions of the shared resources of the HSDPA channel 105 to support the different service options and provides a list of these costs to the example resource negotiator 315 via the example signaling channel 130.

After receiving the list of service options and the list of associated costs, the example resource negotiator 315 causes the service options and associated costs to be displayed to the device's user via the example GUI 310. Additionally, the example resource negotiator 315 may access the example UE configuration storage element 320 to obtain, for example, stored profile information, preference information, etc., to be displayed with and/or modify the display of the service options and associated costs by the example GUI 310. For example, the profile and/or preference information stored in the example UE configuration storage element 320 may correspond to a subscription plan associated with the example user device 110 which, for example, may cause certain of the service option(s) and/or respective cost(s) to be indicated (e.g., highlighted) as the default service option to be selected. In another example, the profile and/or preference information stored in the example UE configuration storage element 320 may indicate a preference for a particular default service option to be selected. For example, in the latter implementation, the stored profile and/or preference information may indicate that the device's user prefers service options that incur no over-the-air charges for allocation of the shared HSDPA resources above a default/nominal charge.

To complete the second phase of HSDPA shared resource allocation in the example user device 110, the example resource negotiator 315 signals a selected service option to the example base station 125 via the example signaling channel 130. For example, the device's user may select one of the available service options based on its associated costs. In such an example implementation, the resource negotiator 315 receives the user's selection via the example GUI 310 (or via any device input, such as by pressing one or more buttons on a keypad, keyboard, etc.) and signals the selection to the example base station 125. Alternatively, the example resource negotiator 315 may be configured to automatically select a service option based on profile information, preference information, etc, stored in the example UE configuration storage element 320.

At the base station side, to perform the second phase of the HSDPA shared resource allocation as indicated by the circles labeled with a number "2" in FIG. 2, the example base station 125 includes a resource processor 325 and a resource allocator 330. In the illustrated example, the resource processor 325 and the resource allocator 330 are implemented by a radio network controller (RNC) 335 associated with the example base station 125. In the illustrated example, the resource processor 325 is configured to determine the set of costs associated, respectively, with the possible service options for providing the requested application content (e.g., such as streaming video content) over the HSDPA channel 105 to the example user device 110. As discussed above, the example resource processor 325 may obtain the list of service options from the example user device 110 via the example signaling channel 130 and/or by extracting the list of service options from message(s) exchanged between the example application server 145 and the example user device 110 via the example signaling connection 155.

In general, the resource processor 325 of the illustrated example performs one or more algorithms to determine the set of costs associated, respectively, with the list of service options, with a goal of improving revenue generation for the service provider/network operator while guaranteeing service delivery quality on the HSDPA channel 105. For example, the cost determination algorithm(s) performed by the example resource processor 325 may consider service requests from other user devices to optimize the resource allocation of the HSDPA channel 105 based on a determined amount of the shared HSDPA resources under consideration for allocation in response to the plurality of pending service requests. Additionally or alternatively, the example resource processor 325 may consider service requests from all user devices, including the example user device 110, and prioritize the service requests based on, for example, subscription plan and/or profile information associated with the user device(s). Additionally or alternatively, the cost determination algorithm(s) performed by the example resource processor 325 may be based on any or all of the following factors: (1) a percentage utilization of the shared HSDPA resources being allocated to service the plurality of pending service requests; (2) a subscription plan associated with the example user device 110; (3) an amount of revenue to be generated by allocation of the shared HSDPA resources to service the plurality of pending service requests; (4) an overall service delivery quality resulting from allocating the shared HSDPA resources to service the plurality of pending service requests, etc. As such, any appropriate cost determination algorithm is considered within the scope of the shared resource allocation methods and apparatus described herein.

To complete the second phase of HSDPA shared resource allocation in the example base station 125, the example resource allocator 330 is configured to allocate at least a portion of the shared resources of the HSDPA channel 105 to the example user device 110 according to a particular service option selected from the list of possible service options. As discussed above, the example resource allocator 330 may receive the selected service option (e.g., based on a user selection and/or stored information) from the example user device 110 via the example signaling channel 130. Alternatively, the example resource processor 325 may be configured to automatically select a particular service option based on, for example, subscription plan and/or profile information associated with the example user device 110 and provide this selection to the example resource allocator 330. In either example implementation, the example resource allocator 330 then allocates an appropriate portion of the shared resources of the HSDPA channel 105 to the example user device 110 based on the selected service option. For example, the resource allocator 330 may allocate an appropriate number of HSDPA time slot(s) and/or HSDPA channel codes to provide the bandwidth (i.e., data rate) required to support the selected service option.

The third phase of HSDPA shared resource allocation as indicated by the circles labeled with a number "3" in FIG. 2 occurs after or in parallel with the allocation of the appropriate portion of the shared resources of the HSDPA channel 105 to the example user device 110 according to the selected service option. During this third phase, the example user device 110 requests that the application server 145 provide the application content (e.g., streaming video content) according to the selected service option negotiated with the example base station 125. For example, in the context of streaming video content, the example user device 110 requests the desired video content and the example application server 145 begins providing (e.g., streaming) the video content at the video resolution/bit rate corresponding to the selected service option via, for example, the traffic connection 150.

To perform the fourth phase of HSDPA shared resource allocation as indicated by the circles labeled with a number "4" in FIG. 2, the example base station 125 includes a scheduler 340. In the illustrated example, the scheduler 340 is implemented by a Node-B 345 associated with the example base station 125. The example scheduler 340 is configured to schedule transmission of data packets over the HSDPA channel 105 to the example user device 110 according to the shared HSDPA resources allocated to the user device 110 by the example resource allocator 330. For example, the scheduler 340 may receive the application content data being transmitted by the example application server 145 over the example traffic connection 150. The example scheduler 340 then segments the received data into packets for transmission to the example user device 110 within the time slot(s) and channel code(s)) of the HSDPA channel 105 allocated by the example resource allocator 330.

In an example implementation of the communication network 200, the second, third and fourth phases of HSDPA shared resource allocation described above may be repeated while the example application server 145 is delivering the selected application content to the example user device 110. Such an implementation allows the example user device 110 to renegotiate its allocation of the shared resources of the HSDPA channel 105. For example, upon receiving the application content over the HSDPA channel 105 according to an initially negotiated service option, the user of the user device 100 may be willing to pay an increased fee to improve the quality of service or may decide that a lower quality of service would be acceptable and, thus, wish to lower the fee currently being paid for HSDPA resource allocation.

To support such renegotiation of shared HSDPA resource allocation, the example resource negotiator 315 included in the example user device 110 may be further configured to signal a request to the example base station 125 for a new list of costs and a list of associated available service options (because the available service options may have changed in the interim due to allocation and/or de-allocation of resources to/from other user devices). The example resource processor 325 included in the example base station 125 may be further configured to process the request and determine the new list of costs and associated service options. The example resource allocator 330 included in the example base station 125 may also be further configured to reallocate the shared HSDPA resources (e.g., time slot(s) and/or channel code(s)) in response to receiving a new service option selection from the example user device 110 or the example resource processor 325. Additionally, the example application server 145 and the example scheduler 340 included in the example Node-B 345 associated with the example base station 125 may be further configured to re-convey and re-schedule, respectively, transmission of the application content to the example user device 110 according to the renegotiated service option.

Figure 3:
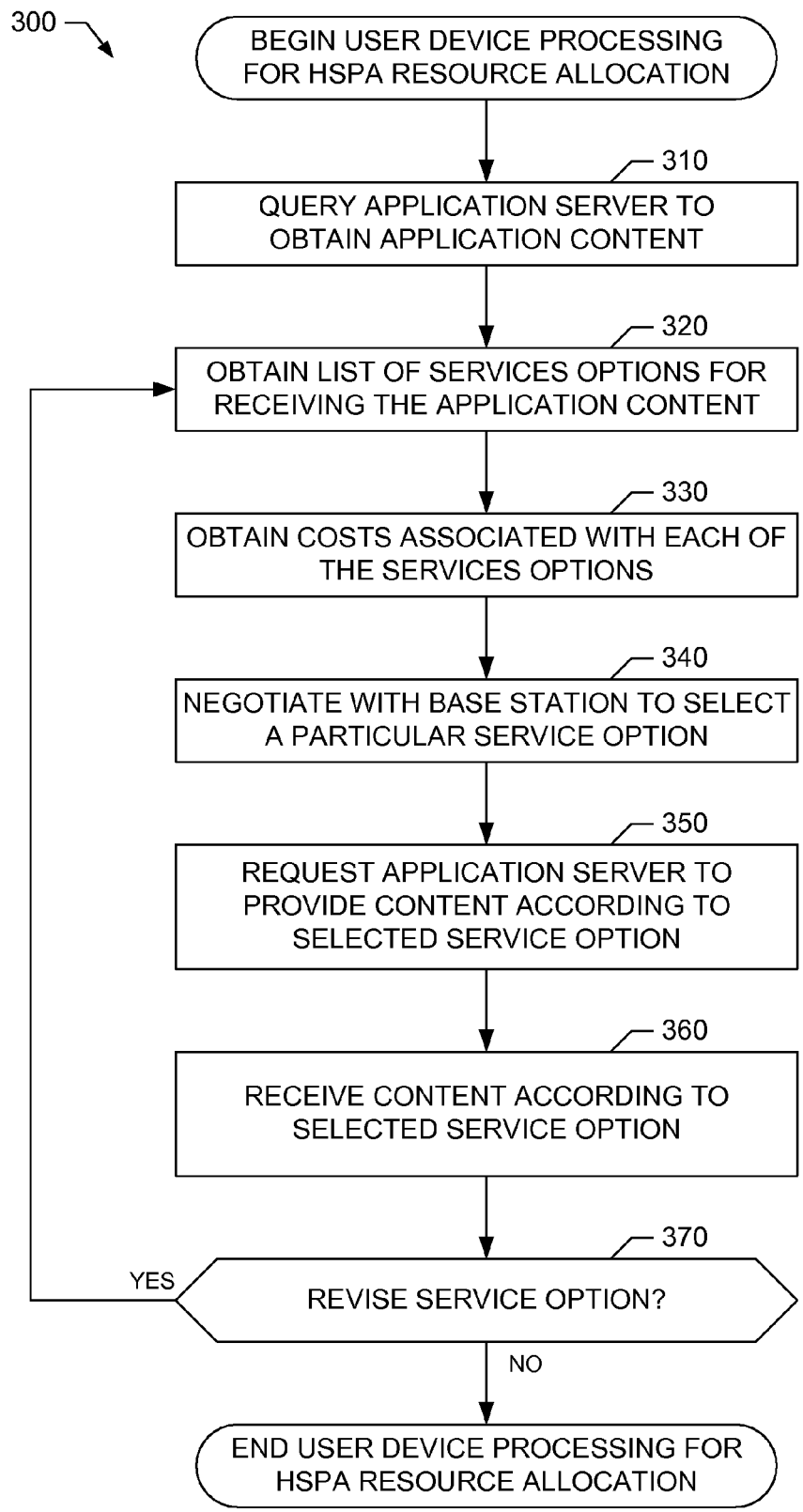
FIG. 3 is a flowchart representative of example machine readable instructions that may be executed to implement user device processing for HSPA shared resource allocation to implement the first and/or second example mobile communication networks of FIGS. 1 and 2, respectively.
Figure 4:
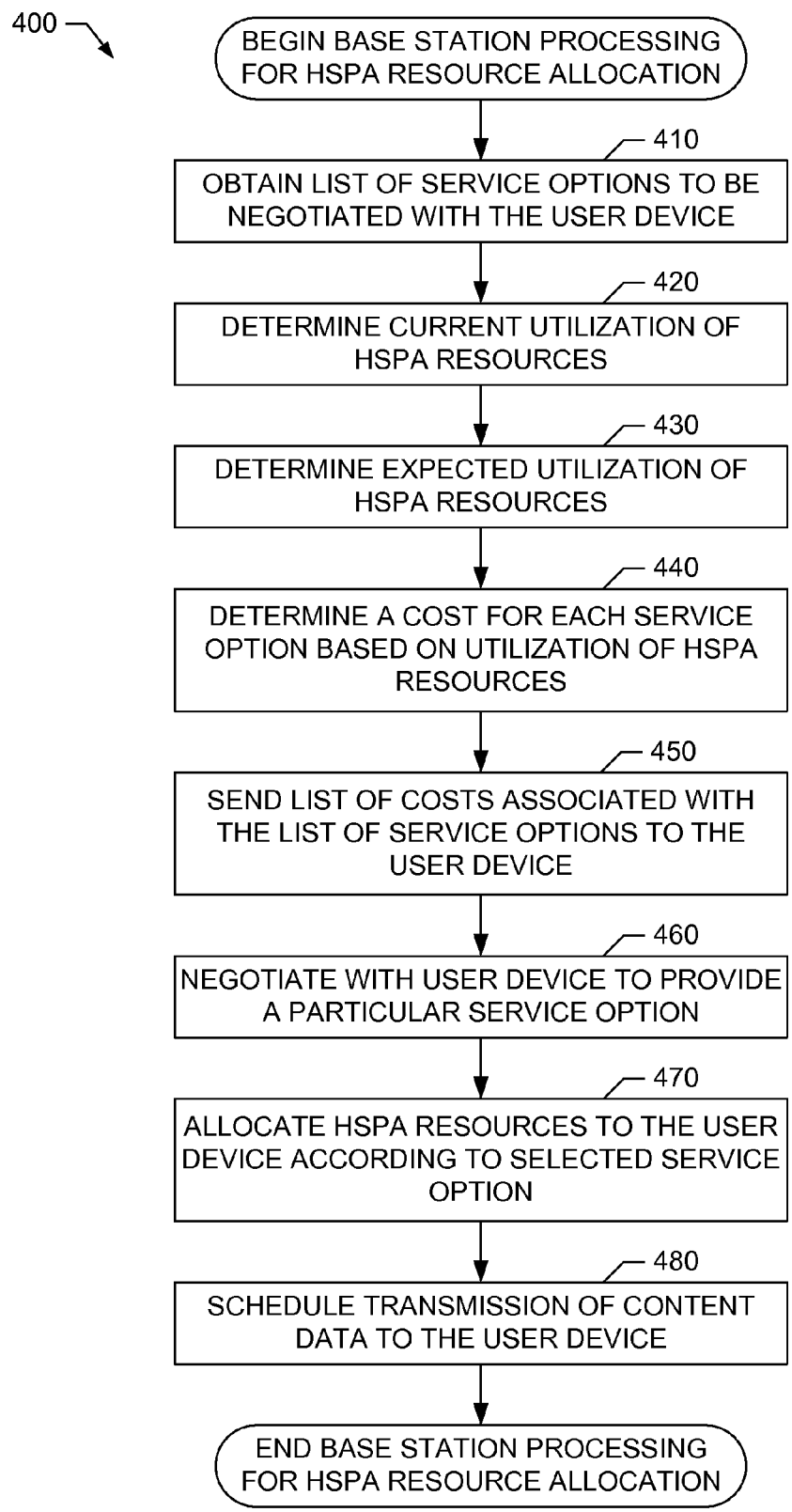
FIG. 4 is a flowchart representative of example machine readable instructions that may be executed to implement base station processing for HSPA shared resource allocation to implement the first and/or second example mobile communication networks of FIGS. 1 and 2, respectively.
Figure 5:
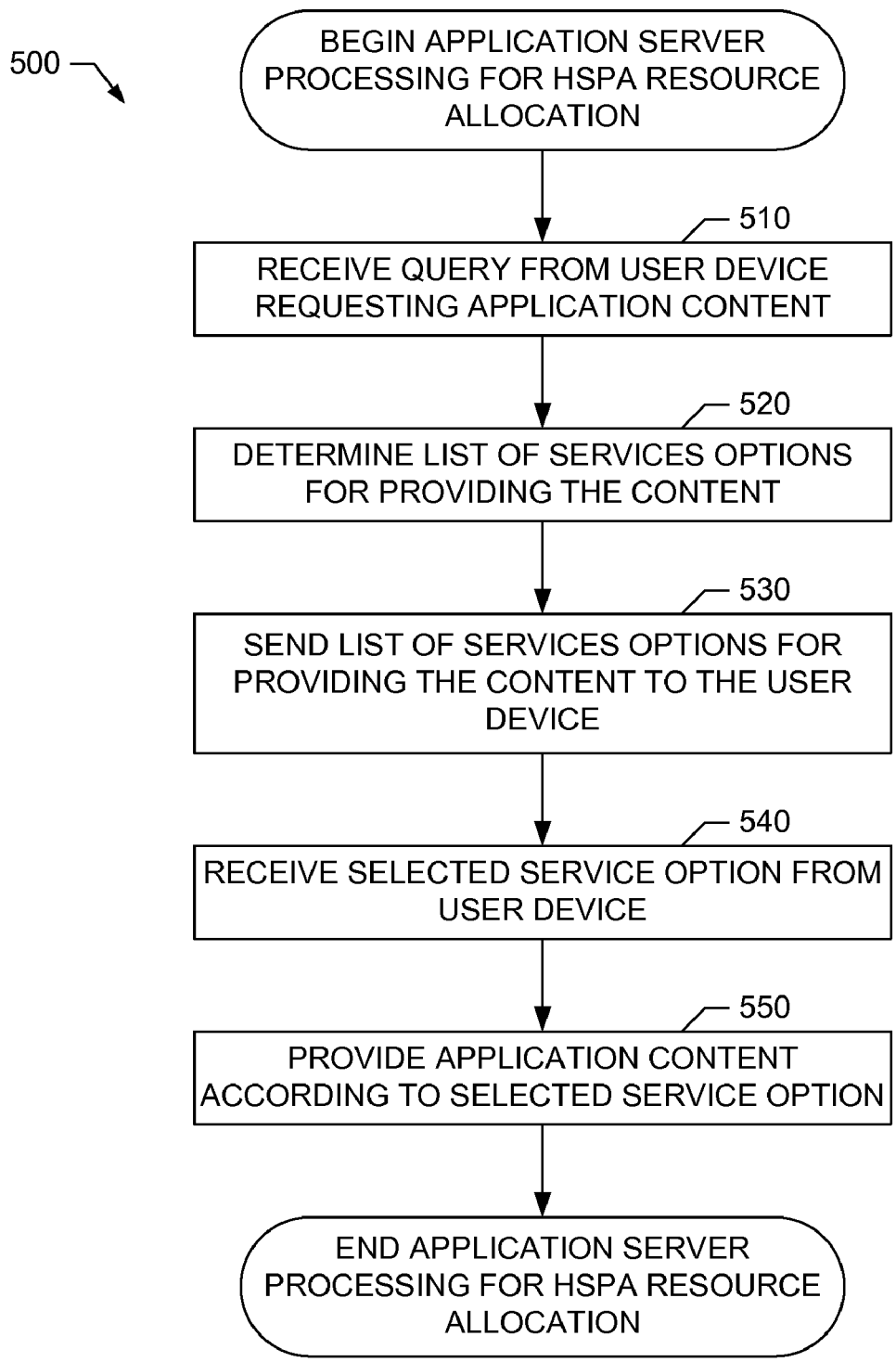
FIG. 5 is a flowchart representative of example machine readable instructions that may be executed to implement application server processing for HSPA shared resource allocation to implement the first and/or second example mobile communication networks of FIGS. 1 and 2, respectively.

Flowcharts representative of example machine readable instructions that may be executed to implement, at least in part, the example communication networks 100 and/or 200, the user devices 110, 155 and/or 120, the example base station 125, the example application server 145, the example query service processor 305, the example GUI 310, the example resource negotiator 315, the example UE configuration storage element 320, the example resource processor 325, the example resource allocator 330, the example RNC 335, the example scheduler 340 and/or the example Node-B 345 are shown in FIGS. 3-5. In these examples, the machine readable instructions represented by each flowchart may comprise one or more programs for execution by: (a) a processor, such as the processor 612 shown in the example computer 600 discussed below in connection with FIG. 6, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 612, but the entire program or programs and/or portions thereof could alternatively be executed by a device other than the processor 612 and/or embodied in firmware or dedicated hardware (e.g., implemented by an Application Specific Integrated Circuit (ASIC), a Programmable Logic Device (PLD), a Field Programmable Logic Device (FPLD), discrete logic, etc.). For example, any or all of the example communication networks 100 and/or 200, the user devices 110, 155 and/or 120, the example base station 125, the example application server 145, the example query service processor 305, the example GUI 310, the example resource negotiator 315, the example UE configuration storage element 320, the example resource processor 325, the example resource allocator 330, the example RNC 335, the example scheduler 340 and/or the example Node-B 345 could be implemented by any combination of software, hardware, and/or firmware. Also, some or all of the machine readable instructions represented by the flowchart of FIGS. 3-5 may be implemented manually. Further, although the example machine readable instructions are described with reference to the flowcharts illustrated in FIGS. 3-5, many other techniques for implementing the example methods and apparatus described herein may alternatively be used. For example, with reference to the flowcharts illustrated in FIGS. 3-5, the order of execution of the blocks may be changed, and/or some of the blocks described may be changed, eliminated, combined and/or subdivided into multiple blocks.

Example machine readable instructions 300 that may be executed to implement user device processing for HSPA shared resource allocation in the example communication networks 100 and/or 200 are shown in FIG. 3. Without loss of generality, and for ease of discussion, the following description of the example machine readable instructions 300 refers to the example user device 110 in the example communication network 200 as the place of execution. However, the instructions may additionally or alternatively be executed by the example user device 110 in the example communication network 100 and/or by any other example user device (e.g., such as the example user devices 115 and/or 120).

The example machine readable instructions 300 may be executed, for example, upon occurrence of an event indicating that the example user device 110 is to start requesting application content from an application server included in or accessible via the example communication network 200, such as, for example, the application server 145. The example machine readable instructions 300 begin execution at block 310 at which the example user device 110 queries the example application server 145, via the example signaling channel 130 and the example signaling connection 155, to obtain application content, such as the example streaming video content discussed above. Control then proceeds to block 320 at which the example user device 110 obtains a list of service options for offering the application content (e.g., such as the example streaming video content) requested via the query sent to the example application server 145 at block 310. For example, in response to requesting streaming video content at block 310, the example user device 110 at block 320 may receive a list of service options which includes a list of offered video resolutions and/or corresponding required bit rates for providing the streaming video content. In an example implementation, the list of service options is provided by the example application server 145 via the signaling connection 155 and the signaling channel 130. In another example implementation, the list of service options is provided by the example base station 125 via the signaling channel 130 after the base station 125 receives service information from the application server 145 via the signaling connection 155.

After receiving the list of service options at block 320, control proceeds to block 330 at which the example user device 110 obtains a list of costs associated with the list of service options obtained at block 320. In the illustrated example, each cost corresponds to a respective service option and specifies a fee for obtaining the requested application content (e.g., streaming video content) at the respective service option (e.g., video resolution, bit rate, etc.). In some example implementations, each cost includes two fees, namely, a first fee for obtaining the content from the application server 145 and a second fee for obtaining a certain allocation of the shared resources of the HSDPA channel 105 commensurate with the respective service option. In an example implementation (e.g., such as in which different service providers are responsible for the example base station 125 and the example application server 145), the list of costs are determined by the example base station 125 after receiving the list of service options from the example user device 110 via the example signaling channel 130. In another example implementation (e.g., such as in which the same service provider is responsible for both the example base station 125 and the example application server 145), the base station 125 determines the list of costs after extracting service option information from the message(s) exchanged between the application server 145 and the user device 110 via the signaling connection 155. In either example implementation, at block 330 the example user device I 10 receives the list of costs from the example base station 125 via the example signaling channel 130.

After obtaining the list of costs at block 330, control proceeds to block 340 at which the example user device 110 negotiates with the example base station 125 to select a particular service option for providing the requested application content (e.g., streaming video content). The example user device 110 then signals the selected service option to the example base station 125 via the example signaling channel 130. In particular, at block 340 the example user device 110 uses the obtained list of service options and associated costs to select a particular service option and, thus, a corresponding particular allocation of the shared resources of the HSDPA channel 105 to receive the requested application content. For example, at block 340 the example resource negotiator 315 included in the example user device 110 may obtain the list of service options and associated costs, display this information via the example GUI 310, and receive a user selection via the GUI 310. Additionally, and as discussed above, the example resource negotiator 315 may modify the display of the service options and associated costs based on stored profile information, preference information, etc., retrieved from the example UE configuration storage element 320. Alternatively, the example resource negotiator 315 may use the information retrieved from the example UE configuration storage element 320 to automatically select a particular service option with an associated cost without displaying any information via the example GUI 310 and/or requiring any user intervention.

Next, after selecting a service option based on the processing at block 340, control proceeds to block 350 at which the example user device 110 requests that the example application server 145 provide the requested application content (e.g., streaming video content) according to the selected service option (e.g., selected video resolution, bit rate, etc.). Then, at block 360 the example user device 110 receives the requested application content from the application server 145 according to the selected service option.

Next, control proceeds to block 370 at which the example user device 110 determines whether the service option (e.g., selected video resolution and/or bit rate) for providing the requested application content (e.g., streaming video content) should be revised. For example, after reception of the requested application content begins, the user of the example user device 110 may be willing to pay an increased fee for an improved quality of service or may decide that a lower quality of service would be acceptable and, thus, wish to lower the fee currently being paid for HSDPA resource allocation. If the example user device 110 determines (e.g., via user input) that the service option for providing the requested application content should be revised (block 370), control returns to block 320 and blocks subsequent thereto at which the example user device 110 obtains a new list of service options and associated costs and repeats the negotiation process. However, if the example user device 110 determines (e.g., via user input or an absence of any user input) that the service option for providing the requested application content should not be revised (block 370), execution of the example machine readable instructions 300 ends.

Example machine readable instructions 400 that may be executed to implement base station processing for HSPA shared resource allocation in the example communication networks 100 and/or 200 are shown in FIG. 4. Without loss of generality, and for ease of discussion, the following description of the example machine readable instructions 400 refers to the example base station 125 in the example communication network 200 as the place of execution. However, the instructions may additionally or alternatively be executed by the example base station 125 in the example communication network 100, in a different network, and/or by one or more devices located elsewhere in a network.

The example machine readable instructions 400 may be executed, for example, upon an event indicating that the example base station 125 will need to allocate or reallocate at least a portion of the shared resources of the HSDPA channel 105 of the example communication network 200 to a user device, such as, for example, the user device 110. The example machine readable instructions 400 begin execution at block 410 at which the example base station 125 obtains a list of service options to be negotiated with the example user device 110 for providing application content to the user device 110. For example, at block 410 the example resource processor 325 included in the example base station 125 may obtain the list of service options from the example user device 110 itself via the example signaling channel 130. Additionally or alternatively, the example resource processor 325 may extract the list of service options from message(s) exchanged between the example application server 145 and the example user device 110 via the example signaling connection 155.

After obtaining the list of service options at block 410, control proceeds to block 420 at which the example base station 125 determines the current utilization of the shared resources of the HSDPA channel 105. For example, at block 420 the example resource processor 325 may determine the current amount of shared HSDPA resources actually allocated to the user device(s) served by the example base station 125. Next, control proceeds to block 440 at which the example base station 125 determines an expected utilization of the shared resources of the HSDPA channel 105. For example, at block 440 the example resource processor 325 may combine the current amount of shared HSDPA resources determined at block 420 with a determined amount of the shared HSDPA resources under consideration for allocation in response to one or more pending service requests from the user device 110 and any other user devices served by the example base station 125.

Next, control proceeds to block 440 at which the example base station 125 determines a cost associated with each service option in the list of service options obtained at block 410. For example, at block 420 the example resource processor 325 may determine the costs for the respective service options based on the expected utilization of shared HSDPA resources determined at block 430 with a goal of improving revenue generation while guaranteeing service delivery quality on the HSDPA channel 105. For example, at block 440 the resource processor 325 may determine the costs based on any or all of the following factors: (1) a percentage utilization of the shared HSDPA resources being allocated to service the plurality of pending service requests, (2) a subscription plan associated with the example user device 110; (3) an amount of revenue to be generated by allocation of the shared HSDPA resources to service the plurality of pending service requests; (4) an overall service delivery quality resulting from allocating the shared HSDPA resources to service the plurality of pending service requests, etc.

After determining the costs at block 440 associated with the list of service options obtained at block 410, control proceeds to block 450 at which the example base station 125 sends the list of costs to the example user device 110 via the example signaling channel 130. Control then proceeds to block 460 at which the example base station 125 negotiates with the example user device 110 for a particular service option and associated cost. For example, at block 460 the example resource allocator 330 included in the example base station 125 may receive a message from the user device 110 via the example signaling channel 130 indicating the particular service option selected by the user device 110 from the list of service options. Alternatively, at block 460 the example resource processor 325 may be configured to automatically select a particular service option for the example user device and provide this selection to the example resource allocator 330. For example, the resource processor 325 could use subscription plan/profile information associated with the example user device 110 to select a preferred service option consistent with one of the costs determined at block 440.

After negotiating with the example user device 110 at block 460 and obtaining/determining a selected service option, control proceeds to block 470 at which the example base station 125 allocates an appropriate portion of the shared resources of the HSDPA channel 105 according to the selected service option. For example, at block 470 the resource allocator 330 may allocate an appropriate number of HSDPA time slot(s) and/or HSDPA channel codes to provide the bandwidth (i.e., data rate) required to support the selected service option. Control then proceeds to block 480 at which the example base station 125 schedules transmission of the application content (e.g., streaming video content) to the example user device 110 according to the selected service option. For example, at block 480 the example scheduler 340 included in the example base station 125 may schedule transmission of data packets over the HSDPA channel 105 to the example user device 110 according to the shared HSDPA resources allocated to the user device 110. In such an example implementation, the scheduler 340 may receive the application content data being transmitted by the example application server 145 over the example traffic connection 150 and segment the received data into packets for transmission to the example user device 110 within the time slot(s) and channel code(s) of the HSDPA channel 105 allocated by the example resource allocator 330 at block 470. After application content scheduling at block 480 is complete, execution of the example machine readable instructions 400 ends.

Example machine readable instructions 500 that may be executed to implement application server processing for HSPA shared resource allocation in the example communication networks 100 and/or 200 are shown in FIG. 5. Without loss of generality, and for ease of discussion, the following description of the example machine readable instructions 400 refers to the example application server 145 in the example communication network 200 as the place of execution. However, the instructions may additionally or alternatively be executed by the example application server 145 in the example communication network 100 and/or by another network device in the network 100 and/or a different network.

The example machine readable instructions 500 may be executed, for example, upon an event indicating that the example application server 145 is being requested to serve application content to a user device, such as, for example, the user device 110 in the example communication network 200. The example machine readable instructions 500 begin execution at block 510 at which the example application server 145 receives a query from the example user device 110 requesting application content, such as the example streaming video content discussed above. For example, at block 510 the query service processor 305 included in the example application server 145 may receive the query from the example user device 110 via the example signaling channel 130 and the example signaling connection 155.

After receiving the query at block 510, control proceeds to block 520 at which the example application server 145 determines a list of service options for providing the requested application content (e.g., streaming video content) to the example user device 110. For example, at block 520 the example query service processor 305 provides a list of service options (e.g., such as video resolutions and/or corresponding bit rates) for providing the application content requested in the query received at block 510. After determining the list of service options at block 520, control proceeds to block 530 at which the example application server 145 sends the list of service options for providing the requested application content back to the example user device 110 via the example signaling connection 155 and the example signaling channel 130.

Next, control proceeds to block 540 at which the example application server 145 receives a selection from the example user device 110 specifying a selected service option from the list of service options provided at block 530. Control then proceeds to block 550 at which the example application server begins providing the requested application content (e.g., streaming video content) to the example user device 110 according to the selected service option received at block 540. For example, at block 550 the example application server 145 may begin streaming requested video content to the example user device 110 via the example traffic connection 150 at a video resolution/bit rate corresponding to the selected service option received at block 540. After the example application server 145 provides the application content at block 550, execution of the example machine readable instructions 500 ends.

Figure 6:
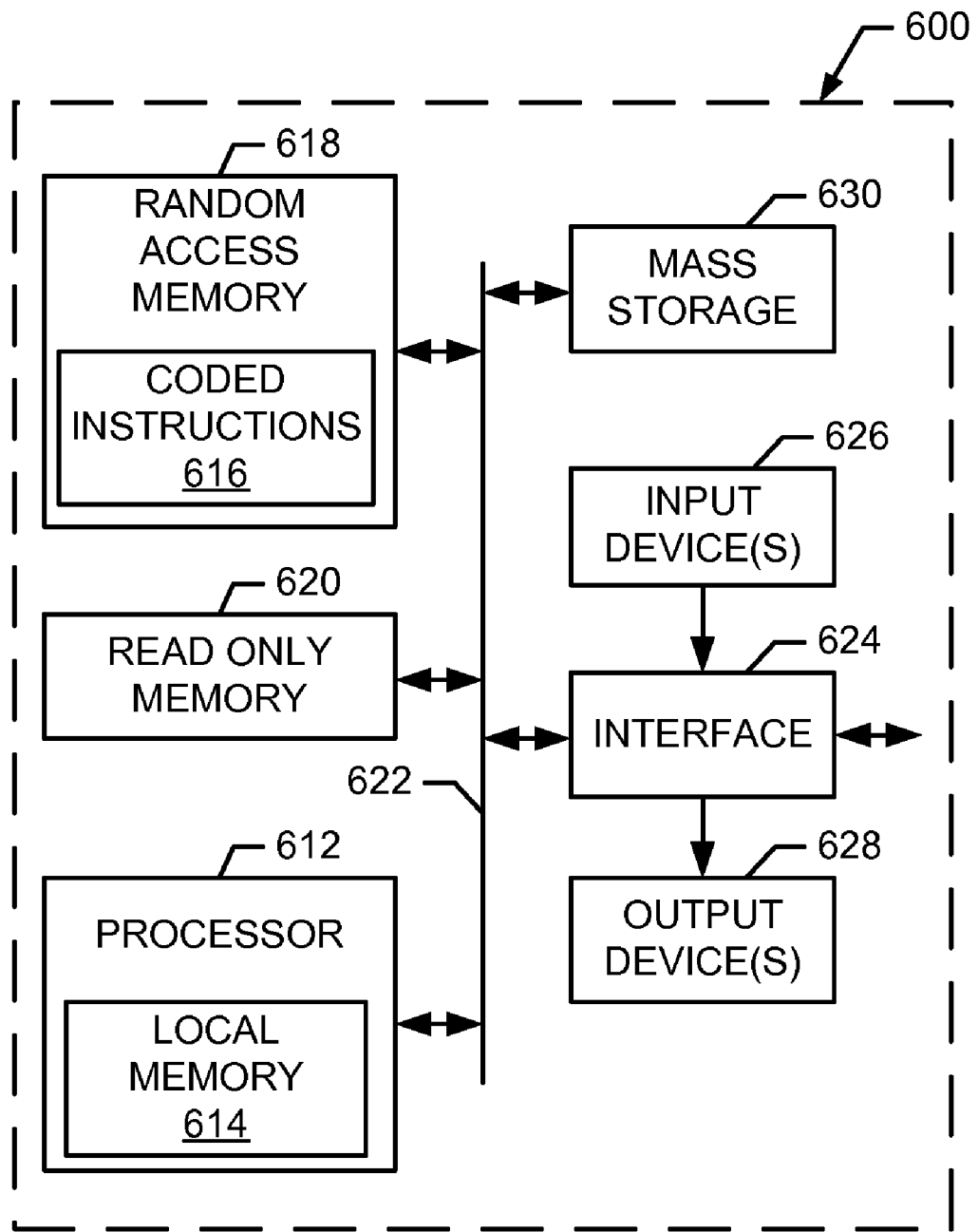
FIG. 6 is a block diagram of an example processor platform that may execute the example machine readable instructions of FIGS. 3-4 and/or 5 to implement the first and/or second example mobile communication networks of FIGS. 1 and 2, respectively.

FIG. 6 is a block diagram of an example computer 600 capable of implementing the apparatus and methods disclosed herein. The computer 600 can be, for example, a server, a personal computer, a Personal Digital Assistant (PDA), an Internet appliance, a DVD player, a CD player, a digital video recorder, a personal video recorder, a set top box, or any other type of computing device.

The system 600 of the instant example includes a processor 612 such as a general purpose programmable processor. The processor 612 includes a local memory 614, and executes coded instructions 616 present in the local memory 614 and/or in another memory device. The processor 612 may execute, among other things, the machine readable instructions represented in FIGS. 3-5. Additionally or alternatively, the processor 612 may implement, for example, the example query service processor 305, the example GUI 310, the example resource negotiator 315, the example resource processor 325, the example resource allocator 330 and/or the example scheduler 340. The processor 612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 612 is in communication with a main memory including a volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown).

The computer 600 also includes an interface circuit 624. The interface circuit 624 may be implemented by any type of interface standard, such as an Ethernet interface, a Universal Serial Bus (USB), and/or a 3rd Generation Input/Output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, an isopoint and/or a voice recognition system.

One or more output devices 628 are also connected to the interface circuit 624. The output devices 628 can be implemented, for example, by display devices (e.g., a liquid crystal display, a Cathode Ray Tube display (CRT)), by a printer and/or by speakers. The interface circuit 624, thus, typically includes a graphics driver card.

The interface circuit 624 also includes a communication device such as a modem or network interface card to facilitate exchange of data with external computers via a network (e.g., an Ethernet connection, a Digital Subscriber Line (DSL), a telephone line, coaxial cable, a cellular telephone system, etc.).

The computer 600 also includes one or more mass storage devices 630 for storing software and data. Examples of such mass storage devices 630 include floppy disk drives, hard drive disks, compact disk drives and Digital Versatile Disk (DVD) drives. The mass storage device 630 may implement the example UE configuration storage element 320. Alternatively, the volatile memory 618 may implement the example UE configuration storage element 320.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to allocate shared resources of a high speed packet access channel, the method comprising:

providing information to a user device describing a first plurality of service options for exchanging data associated with a first application or service over the high speed packet access channel, wherein the information comprises a first plurality of costs based on an availability of the shared resources;

allocating at least a portion of the shared resources of the high speed packet access channel to the user device for exchanging data associated with the first application or service according to a first service option selected from the first plurality of service options;

providing a second plurality of costs to the user device for a second plurality of service options for continuing to exchange data associated with the same first application or service over the high speed packet access channel, the second plurality of service options specified in signaling received from the user device; and reallocating a different portion of the shared resources of the high speed packet access channel to the user device in response to the user device selecting a second service option from the second plurality of service options for continuing to exchange data associated with the same first application or service over the high speed packet access channel, wherein the availability of the shared resources is based on a determined amount of shared resources under consideration for allocation in response to a plurality of service requests from a plurality of user devices, and the method further comprises determining the plurality of costs based on at least one of:

a percentage utilization of the shared resources being allocated to service the plurality of service requests;

a subscription plan associated with the user device;

an amount of revenue to be generated by allocation of the shared resources to service the plurality of service requests; or an overall service delivery quality resulting from allocating the shared resources to service the plurality of service requests.

2. A method as defined in claim 1 wherein the high speed packet access channel comprises a high speed downlink packet access channel in a wideband code division multiple access network.

3. A method as defined in claim 1 wherein the shared resources comprise a plurality of time slots and a plurality of channel codes capable of transmitting a plurality of data streams over the high speed packet access channel, and wherein allocating the at least a portion of the shared resources of the high speed packet access channel to the user device comprises selecting an appropriate number of at least one of the plurality of time slots or the plurality of channel codes to support the selected service option.

4. A method as defined in claim 1 further comprising providing the information to the user device in response to a request from the user device for a description of available service options corresponding to a particular application from a plurality of available applications.

5. A method as defined in claim 1 wherein allocating at least a portion of the shared resources to the user device according to the first service option comprises:
scheduling transmission of the data to be exchanged; and
allocating one or more time slots and one or more channel codes of the high speed packet access channel based on the first service option.

6. A method as defined in claim 1 wherein the first service option is selected from the first plurality of service options based on at least one of a subscription plan associated with a user of the user device or a response received from the user device.

7. A method as defined in claim 1 wherein the second plurality of costs are determined based on an updated availability of the shared resources.

8. A method as defined in claim 1 wherein the second plurality of costs is provided to the user device in response to a request from the user device.

9. An apparatus to allocate shared resources of a high speed packet access channel, the apparatus comprising:
a resource processor to determine a plurality of costs associated with a plurality of service options for exchanging data with a user device over a high speed packet access channel, the plurality of service options specified in signaling received from the user device, the plurality of costs determined based on an expected future utilization of the shared resources including an amount of the shared resources not yet allocated but under consideration for future allocation to a plurality of user devices in response to a plurality of service requests from the plurality of user devices, wherein the resource processor is to determine the plurality of costs associated with the plurality of service options based on at least one of:
a percentage utilization of the shared resources being allocated to service the plurality of service requests;
a subscription plan associated with the user device;
an amount of revenue to be generated by allocation of the shared resources to service the plurality of service requests; or
an overall service delivery quality resulting from allocating the shared resources to service the plurality of service requests; and
a resource allocator to:
allocate at least a portion of the shared resources of the high speed packet access channel to the user device according to a selected service option from the plurality of service options; and
reallocate a different portion of the shared resources of the high speed packet access channel to the user device according to a second service option selected from a second plurality of service options for continuing to exchange data over the high speed packet access channel, wherein the resource processor is to determine a second plurality of costs associated with the second plurality of service options.

10. An apparatus as defined in claim 9 further comprising a scheduler to schedule transmission of data packets to the user device according to the at least a portion of the shared resources of the high speed packet access channel allocated to the user device by the resource allocator.

11. An apparatus as defined in claim 9 wherein the shared resources comprise a plurality of time slots and a plurality of channel codes capable of transmitting a plurality of data streams over the high speed packet access channel, and wherein the resource allocator is configured to select an appropriate number of at least one of the plurality of time slots or the plurality of channel codes to support the selected service option.

12. An apparatus as defined in claim 9 wherein the resource processor is to determine the plurality of costs associated with the plurality of service options based on an amount of shared resources already allocated to the plurality of user devices.

13. An apparatus as defined in claim 9 wherein the high speed packet access channel comprises a high speed downlink packet access channel in a wideband code division multiple access network.

14. A user device for exchanging data over a high speed packet access channel, the user device comprising:
a resource negotiator to:
signal first information to a network specifying a first plurality of service options for exchanging data over the high speed packet access channel and for which a first plurality of costs are to be determined; and
obtain the first plurality of costs from the network, the first plurality of costs determined based on an availability of shared resources of the high speed packet access channel, wherein the availability of the shared resources is based on a determined amount of shared resources under consideration for allocation in response to a plurality of service requests from a plurality of user devices, and the plurality of costs is based on at least one of:
a percentage utilization of the shared resources being allocated to service the plurality of service requests;
a subscription plan associated with the user device;
an amount of revenue to be generated by allocation of the shared resources to service the plurality of service requests; or
an overall service delivery quality resulting from allocating the shared resources to service the plurality of service requests; and
a module adapted to implement a graphical user interface to display the first plurality of service options and the first plurality of costs; and
a device input to:
obtain a first selection of one of the first plurality of service options for exchanging data associated with a first application or service over the high speed packet access channel; and
obtain a second selection to reallocate one of a second plurality of service options for continuing to exchange data associated with the same first application or service over the high speed packet access channel, the second selection based on a second plurality of costs displayed by the graphical user interface, the second plurality of costs received from the network and determined based on second information signaled by the resource negotiator to the network to specify the second plurality of service options.

15. A user device as defined in claim 14 wherein the resource negotiator is to obtain a list of the first plurality of service options from an application server providing the data to be exchanged over high speed packet access channel, and to obtain a list of the first plurality of costs from a base station implementing the high speed packet access channel.

16. A user device as defined in claim 14 further comprising a storage element to store at least one of profile information or preference information for use in modifying the display of the first plurality of service options and the first plurality of costs by the graphical user interface.

17. A user device as defined in claim 14 wherein the resource negotiator is to signal the selection of the one of the first plurality of service options to a base station implementing the high speed packet access channel.

18. A user device as defined in claim 14 wherein the high speed packet access channel comprises a high speed downlink packet access channel in a wideband code division multiple access network.

19. A user device as defined in claim 14 wherein the device input is a portion of the graphical user interface.

* * * * *